United States Patent
Nakayama et al.

(10) Patent No.: US 10,008,836 B2
(45) Date of Patent: Jun. 26, 2018

(54) STRUCTURE FOR ATTACHING TEMPERATURE DETECTION MEMBER TO BUS BAR AND WIRING MODULE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Osamu Nakayama, Mie (JP); Ryouya Okamoto, Mie (JP); Naoki Fukushima, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days. days.

(21) Appl. No.: 15/527,471

(22) PCT Filed: Nov. 24, 2015

(86) PCT No.: PCT/JP2015/082828
§ 371 (c)(1),
(2) Date: May 17, 2017

(87) PCT Pub. No.: WO2016/084761
PCT Pub. Date: Jun. 2, 2016

(65) Prior Publication Data
US 2017/0324225 A1    Nov. 9, 2017

(30) Foreign Application Priority Data
Nov. 25, 2014  (JP) ................. 2014-237397

(51) Int. Cl.
*H02B 1/20* (2006.01)
*H01M 10/48* (2006.01)
*H01M 2/20* (2006.01)

(52) U.S. Cl.
CPC .............. *H02B 1/20* (2013.01); *H01M 2/202* (2013.01); *H01M 10/486* (2013.01)

(58) Field of Classification Search
CPC ........ H02B 1/20; H01M 2/202; H01M 10/486
(Continued)

(56) References Cited

U.S. PATENT DOCUMENTS 4,297,668 A * 10/1981 Place ................. H01H 37/5436
248/229.26
5,307,543 A * 5/1994 Krillenberger .......... F16B 2/245
174/84 C
(Continued)

FOREIGN PATENT DOCUMENTS

JP    2012199007 A    10/2012
JP    2013106400 A     5/2013
(Continued)

OTHER PUBLICATIONS

International Search Report and Written Opinion for application PCT/JP2015/082828 dated Jan. 12, 2016; 5 Pages.

*Primary Examiner* — Anatoly Vortman
(74) *Attorney, Agent, or Firm* — Reising Ethington, P.C.

(57) ABSTRACT

A structure for attaching a temperature detection member to a bus bar includes: a bus bar that is overlaid on electrode terminals of single-cell batteries each having positive and negative electrode terminals and electrically connects adjacent electrode terminals of the plurality of single-cell batteries; and a temperature detection member configured to detect the temperature of the bus bar, wherein the temperature detection member includes a plate-shaped detection portion, the detection portion being overlaid on a region of (Continued)

the bus bar other than regions overlaid on the electrode terminals, and the detection portion has a crimped piece that is crimped to the bus bar.

3 Claims, 9 Drawing Sheets

(58) Field of Classification Search
USPC ......................................................... 361/637
See application file for complete search history.

(56) References Cited

U.S. PATENT DOCUMENTS

| | | | | |
|---|---|---|---|---|
| 5,319,356 | A * | 6/1994 | Yoshino | G01K 1/16 |
| | | | | 174/68.2 |
| 5,870,014 | A * | 2/1999 | Nield, Jr. | H01H 61/002 |
| | | | | 337/333 |
| 6,417,758 | B1 * | 7/2002 | Russell | H01H 37/043 |
| | | | | 165/80.1 |
| 6,550,962 | B1 * | 4/2003 | Yang | F16L 3/04 |
| | | | | 24/458 |
| 6,781,504 | B2 * | 8/2004 | Scott | H01H 37/043 |
| | | | | 337/380 |
| 6,814,486 | B2 * | 11/2004 | Sidoni | G01K 1/143 |
| | | | | 374/147 |
| 7,253,602 | B2 * | 8/2007 | Shvach | G01D 21/00 |
| | | | | 324/117 H |
| 7,345,571 | B2 * | 3/2008 | Mizuno | F04B 39/00 |
| | | | | 337/380 |
| 7,909,508 | B2 * | 3/2011 | Maloney | G01D 11/24 |
| | | | | 374/141 |
| 2006/0076838 | A1 * | 4/2006 | Solveson | G01R 15/183 |
| | | | | 307/651 |
| 2013/0280959 | A1 | 10/2013 | Takase | |
| 2015/0125727 | A1 * | 5/2015 | Lui | H01M 2/206 |
| | | | | 429/90 |
| 2015/0372354 | A1 * | 12/2015 | Nakano | H01M 2/206 |
| | | | | 429/90 |
| 2015/0372478 | A1 * | 12/2015 | Zhou | H02H 5/048 |
| | | | | 361/93.8 |
| 2016/0028194 | A1 | 1/2016 | Nakayama | |

FOREIGN PATENT DOCUMENTS

| | | |
|---|---|---|
| JP | 2013109914 A | 6/2013 |
| JP | 2014191953 A | 10/2014 |
| WO | WO2014122905 A1 | 8/2014 |

* cited by examiner

STRUCTURE FOR ATTACHING TEMPERATURE DETECTION MEMBER TO BUS BAR AND WIRING MODULE

CROSS REFERENCE TO RELATED APPLICATIONS

This application claims the priority of Japanese patent application JP2014-237397 filed on Nov. 25, 2014, the entire contents of which are incorporated herein.

TECHNICAL FIELD

The technique disclosed in the present specification relates to a structure for attaching a temperature detection member to a bus bar and relates to a wiring module.

BACKGROUND ART

In an electricity storage module for an electric automobile or a hybrid car, multiple electricity storage elements are connected side-by-side in order to increase output. The multiple electricity storage elements are connected in series or in parallel due to adjacent electrode terminals being connected with connection members such as bus bars.

When such an electricity storage module is used in a high-temperature state, its lifespan may decrease, and with an electricity storage module formed by connecting multiple lithium ion batteries or the like, excessively high temperatures are sometimes reached during charging. In view of this, in order to avoid such a circumstance, temperature sensors for sensing the temperatures of electricity storage elements are attached to the electricity storage module.

For example, there is a temperature sensor including a flat detection portion that is arranged overlaid on a bus bar or on a voltage detection terminal or the like overlaid on a bus bar, and insertion holes are formed in the detection portion. A configuration is used in which electrode posts of electrode terminals or bolts fastened to hole portions of electrode terminals are inserted into the insertion holes, and when the bus bar or voltage detection terminal is connected by fastening to the electrode terminals, the temperature sensor is jointly fastened to the electrode terminals with the bus bar or voltage detection terminal, whereby the temperature sensor is thermally attached to the electricity storage element.

SUMMARY

Incidentally, in recent years, in the connection between the bus bar and the electrode terminals, a method of connecting through laser welding has been proposed instead of fastening using bolts, nuts, or the like. However, if such a connection method is employed, a dedicated fastening member for the temperature sensor is needed in order to fix the temperature sensor with the above-described configuration to the bus bar, as a result of which the number of parts increases and a separate fixing task is needed.

The technique disclosed in the present specification has been completed based on the above-described circumstance, and it is an object thereof to provide a structure for attaching a temperature detection terminal to a bus bar, and a wiring module, with few parts and few work steps.

The technique disclosed in the present specification as the solution to the problem is a structure for attaching a temperature detection member to a bus bar, including: a bus bar that is overlaid on electrode terminals of a plurality of electricity storage elements each having positive and negative electrode terminals, and electrically connects adjacent said electrode terminals of the plurality of electricity storage elements; and a temperature detection member configured to detect the temperature of the bus bar, wherein the temperature detection member includes a plate-shaped detection portion, the detection portion being overlaid on a region of the bus bar other than regions overlaid on the electrode terminals, and the detection portion has a crimped piece that is crimped to the bus bar.

According to the above-described configuration, the detection portion of the temperature detection member is overlaid on the bus bar and a crimped piece is crimped to the bus bar, and thus the detection portion and the bus bar can be reliably connected. Accordingly, there is no need to provide a fastening member that fixes the temperature detection member to the bus bar, and it is possible to reduce the number of parts and reduce the number of work steps.

The above-described structure for attaching the temperature detection member to the bus bar may have the following configuration.

It is possible to use a configuration in which the crimped piece is provided at a position along an edge portion of the bus bar in a state in which the detection portion is overlaid on the bus bar.

With this kind of configuration, the task of attaching the crimped piece to the bus bar is easier compared to a configuration in which the crimped piece is inserted into a hole portion provided on the inner side with respect to the edge of the bus bar and the crimped piece is crimped, for example.

It is possible to use a configuration in which a recessed portion into which the crimped piece fits is provided on the edge portion of the bus bar.

According to this kind of configuration, because the detection portion is positioned with respect to the bus bar, the temperature detection member is less likely to shift with respect to the connection member, and the contact state can be held more reliably.

It is possible to use a configuration in which an abutting piece that abuts against an opposite edge portion opposite to the edge portion of the bus bar to which the crimped piece is crimped is provided at a position on the detection portion that corresponds to the opposite edge portion.

According to this kind of configuration, the detection portion is more reliably positioned with respect to the bus bar by the crimped piece and the abutting piece, and therefore the temperature detection member can be more stably held with respect to the bus bar.

Also, the technique disclosed in the present specification is a wiring module that holds the bus bar and the temperature detection terminal having the above-described attachment structure in an insulating protector.

According to the technique disclosed in the present specification, it is possible to obtain a structure for attaching a temperature detection member to a bus bar, and a wiring module, with few parts and few work steps.

DESCRIPTION OF EMBODIMENTS

An embodiment in which a structure for attaching a temperature detection terminal to a bus bar and a wiring module 20 according to the present specification are applied to a battery module M will be described with reference to FIGS. 1 to 10.

The battery module M according to the present embodiment is mounted in a vehicle (not shown) such as an electric automobile or a hybrid automobile, and is used as a power source for driving the vehicle. The battery module M includes a single-cell battery group 10 formed by aligning multiple single-cell batteries 11 (examples of electricity storage elements), and the wiring module 20, which is attached to the single-cell battery group 10 (see FIG. 9).

Figure 9:
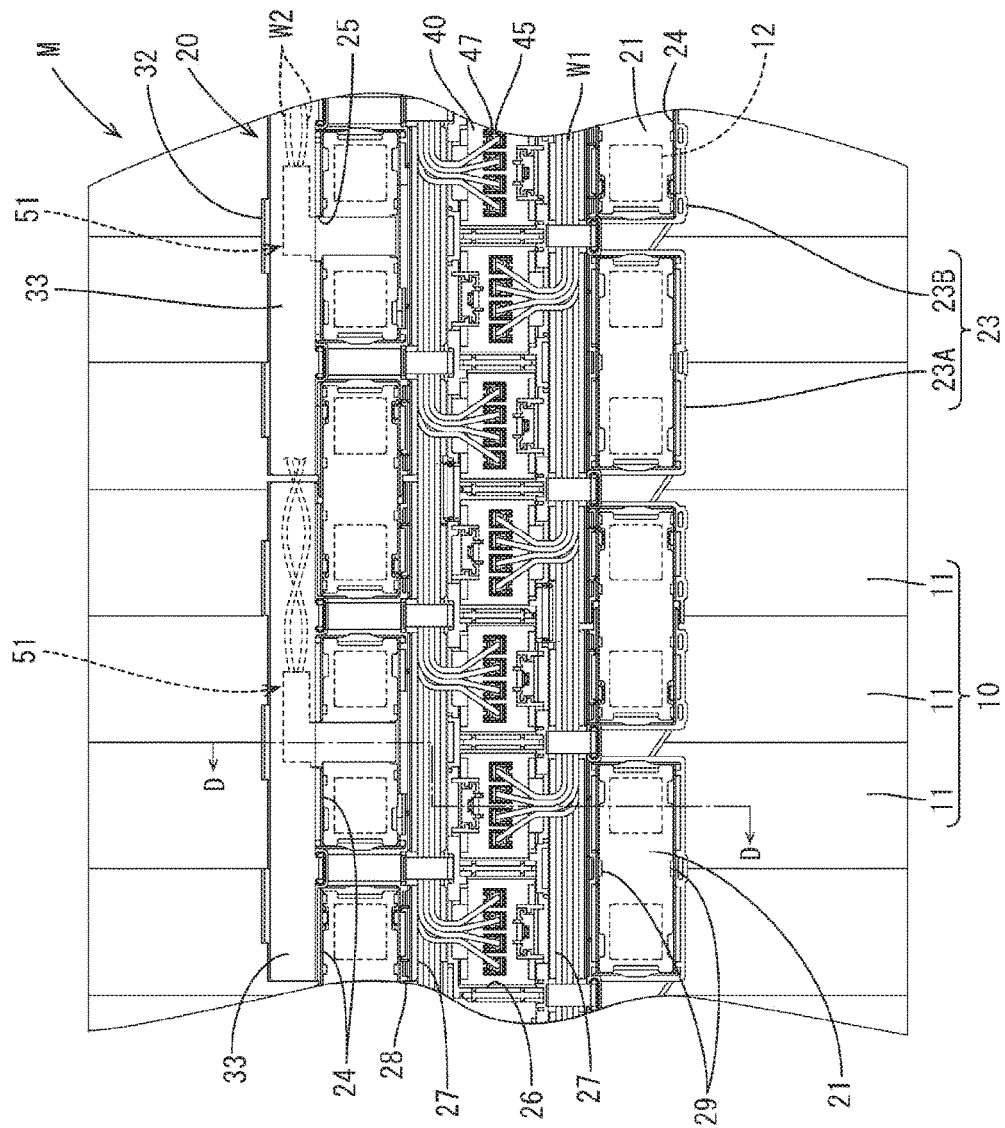
FIG. 9 is a plan view of a battery module in a state where covers are closed.
Figure 10:
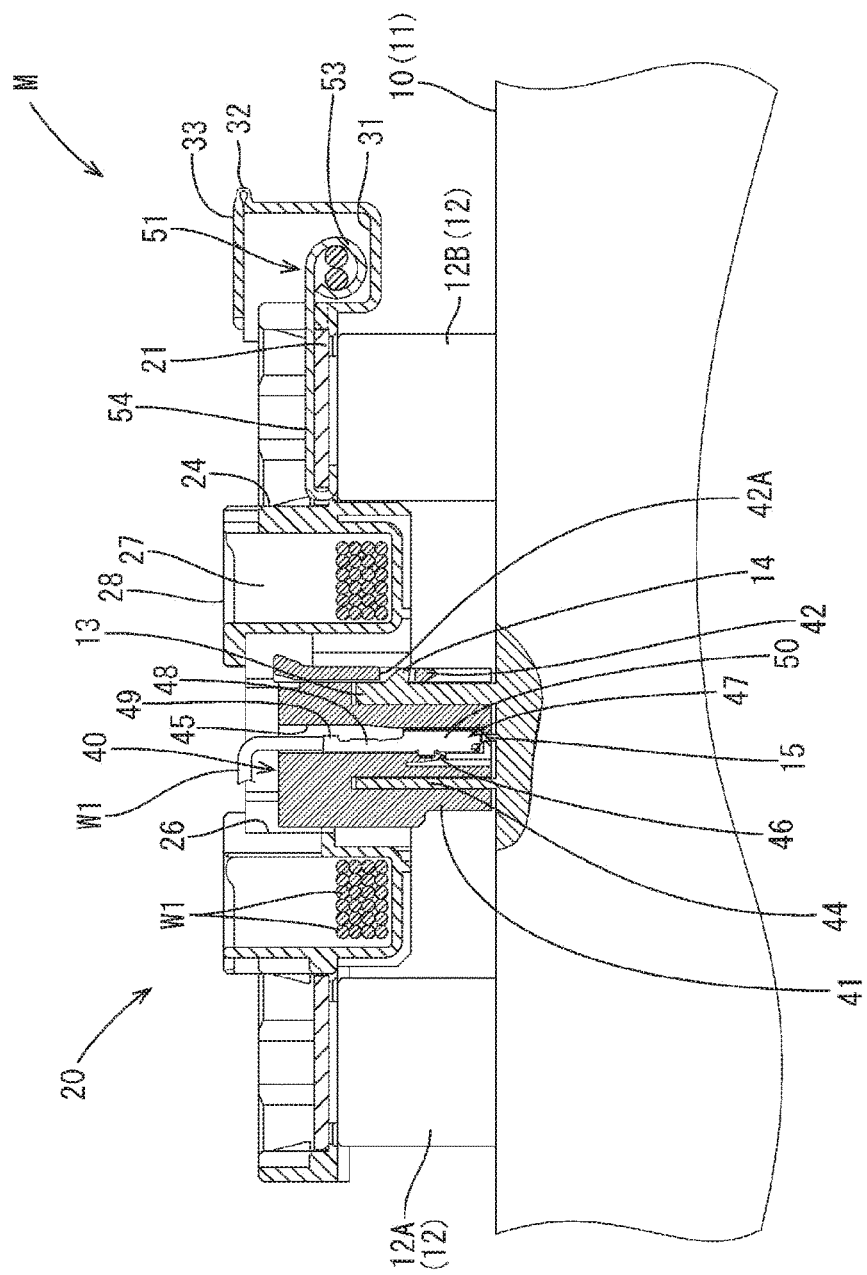
FIG. 10 is a partial cross-sectional view taken along line D-D in FIG. 9.

In the following description, the lower side of FIG. 9 is frontward and the upper side is rearward (inward). Also, the upper side in FIG. 10 is upward, and the lower side is downward. Also, for multiple identical members, one member is denoted by a reference numeral and the other members are not denoted by reference numerals.

Figure 1:
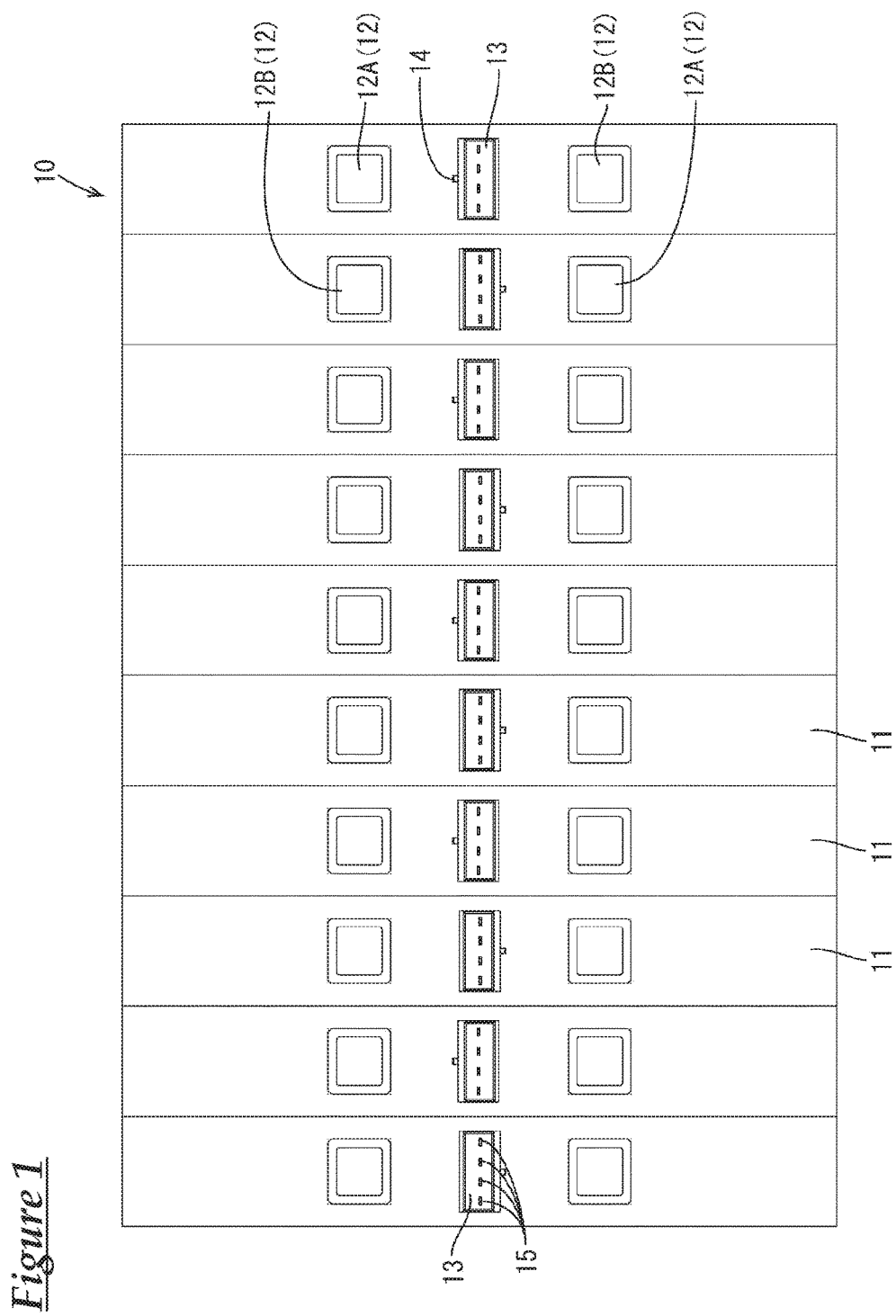
FIG. 1 is a plan view of a single-cell battery group of an embodiment.

The battery module M of the present embodiment has a single-cell battery group 10 formed by aligning multiple single-cell batteries 11, which are each formed by connecting four single-cell batteries (not shown) in series (see FIG. 1). In the present embodiment, power generation elements (not shown) are accommodated inside of the single-cell batteries 11.

The single-cell batteries 11 of the present embodiment have flat, approximately cuboid shapes. Positive and negative electrode terminals 12A and 12B are formed so as to protrude upward at positions near both end portions in the lengthwise direction on the upper surface of each of the single-cell batteries 11. The positive electrode terminals 12A and the negative electrode terminals 12B each have the same shape and size. The electrode terminals 12A and 12B each have a quadrangular prism shape, and the upper surfaces thereof are flat electrode surfaces. The multiple single-cell batteries 11 are aligned such that adjacent electrode terminals 12 have different polarities, and thus the single-cell battery group 10 is formed. The adjacent single-cell batteries 11 are electrically connected by a later-described bus bar 21.

As shown in FIGS. 1 and 10, cylindrical connector portions 13 that are open upward are provided between the positive and negative electrode terminals 12A and 12B. Locking protrusion portions 14 that lock partner-side connectors 40 are formed on the outer walls of the connector portions 13.

Four male terminals 15 that are each connected to a single-cell battery are arranged protruding inside each connector 13. The four terminals 15 are electrically connected to terminals 47 of a partner-side connector 40.

The wiring module 20 includes: multiple bus bars 21 made of metal that are each connected to a positive electrode terminal 12A and a negative electrode terminal 12B of adjacent single-cell batteries 11; insulating protectors 23 that are composed of an insulating material and have bus bar holding portions 24 that hold the bus bars 21; and temperature detection members 51 that detect the temperatures of the bus bars 21.

Figure 4:
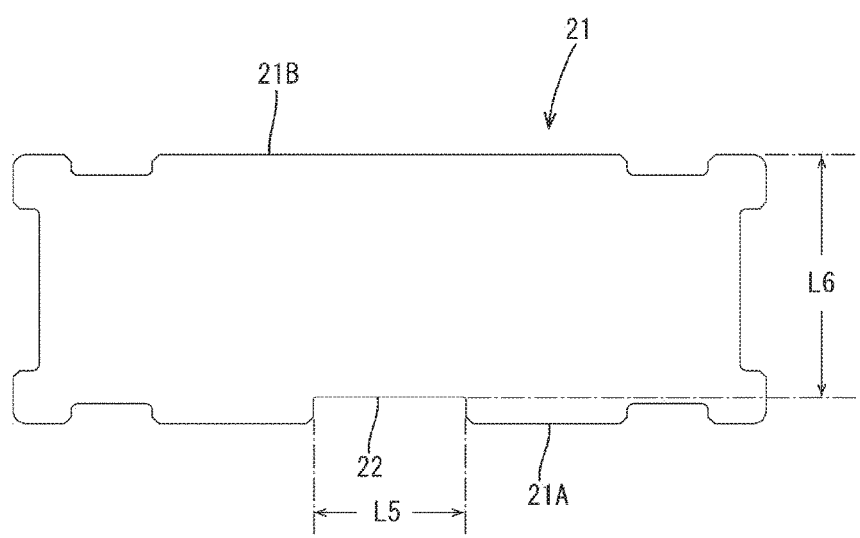
FIG. 4 is a plan view of a bus bar.

The bus bars 21 are formed by pressing a metal plate material composed of copper, copper alloy, stainless steel (SUS), aluminum, or the like into a predetermined shape, and as shown in FIG. 4, the bus bars 21 each have a roughly rectangular shape overall.

In the center of an edge portion (first edge portion 21A) on one side of a pair of long edge portions of the bus bar 21, a recessed portion 22 cut out from the first edge portion 21A toward the inside into a recessed shape is formed so as to fit a later-described crimped piece 55 therein. A width dimension L5 of the recessed portion 22 is set to be a dimension that is equal to or slightly larger than a width dimension L1 of the crimped piece 55 (L5≥L1). Note that an edge portion opposite to the first edge portion 21A will hereinafter be described as a second edge portion 21B (an example of an opposite edge portion).

The insulating protectors 23 are formed by joining multiple joining units 23A, and as shown in FIG. 9, have a shape that is elongated in an alignment direction (left-right direction in FIG. 9) of the single-cell batteries 11. Multiple bus bar holding portions 24 having partitioning walls that are open upward, partition the interior and the exterior, and can hold the bus bars 21 are provided aligned in two rows in the lengthwise direction in the insulating protectors 23. Multiple pressing pieces 29 that prevent the bus bars 21 from popping up are forming on the bus bar holding portions 24.

Among the bus bar holding portions 24 in the two rows, outer-side walls 24A of the bus bar holding portions 24 aligned on the far side (upper side in FIG. 7) have portions cut out, which are used as pass-through portions 25 through which the detection portions 54 of the later-described temperature detection members 51 are passed. The pass-through portions 25 are provided at approximate central portions (positions corresponding to gaps between adjacent electrode terminals 12 in a state where the wiring module 20 is attached to the single-cell battery group 10) in the extension direction of the outer-side walls 24A of certain bus bar holding portions 24.

A width dimension L10 of the pass-through portion 25 is set to be a dimension that is equal to or slightly greater than a sum L2 (see FIG. 2) of the width dimension of the detection portion 54 of the later-described temperature detection member 51 and the dimension by which the abutting piece 56 protrudes from the detection portion 54 in the width direction (L10≥L2).

Figure 7:
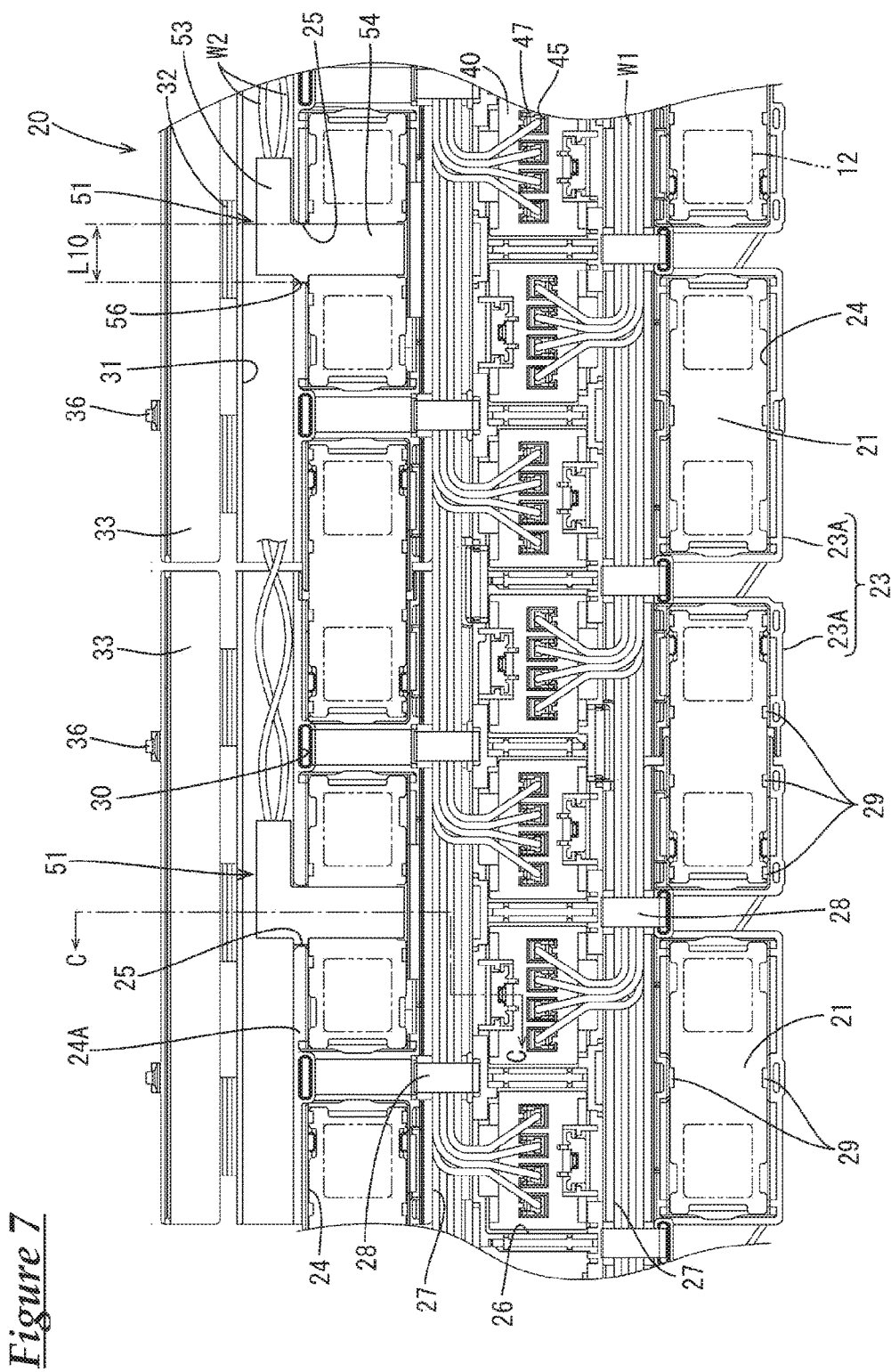
FIG. 7 is a plan view of a wiring module in a state where temperature detection members and bus bars are arranged.
Figure 8:
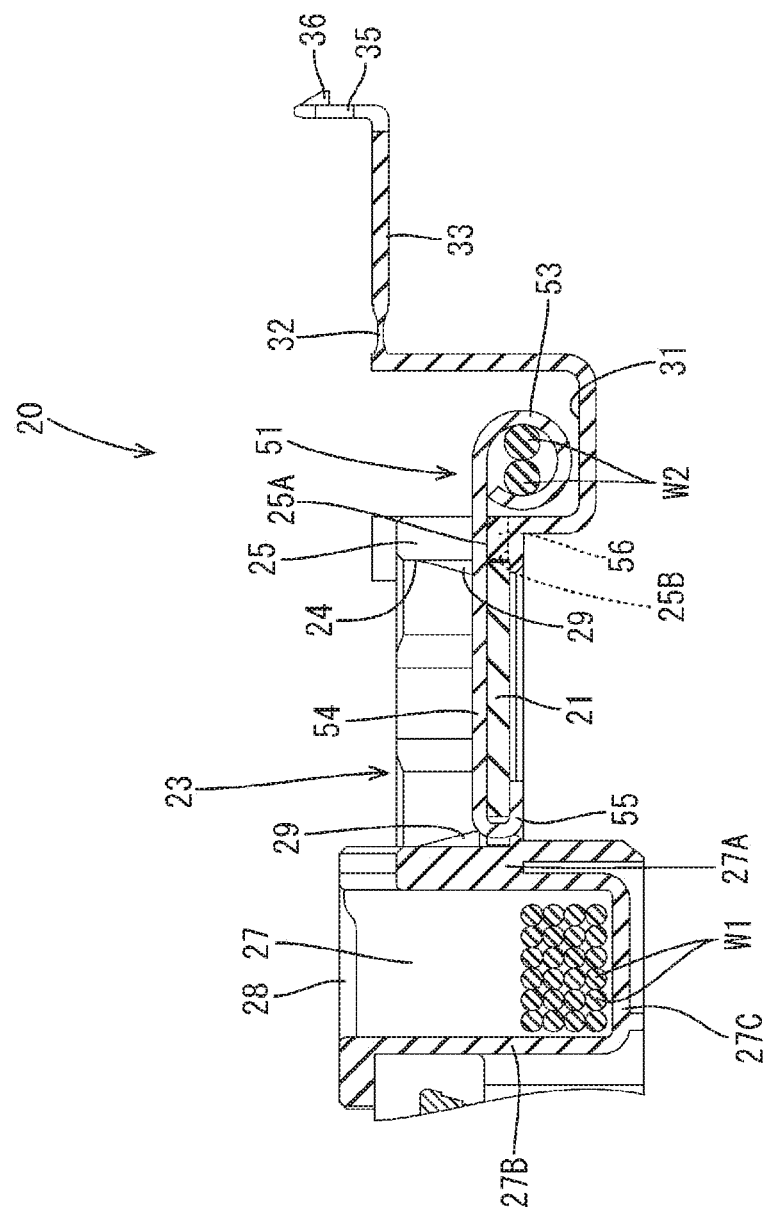
FIG. 8 is a partial cross-sectional view taken along line C-C in FIG. 7.

A bottom portion 25A of the pass-through portion 25 is set to a height that is flush with the upper surface of the bus bar 21 in a state where the bus bar 21 is accommodated in the bus bar holding portion 24 (see FIG. 8). Also, on the bottom portion 25A of the pass-through portion 25, one end side (left side in FIG. 7) in the width direction of the pass-through portion 25 is formed into a recessed portion 25B recessed downward into a recessed shape, and the tip portion of the abutting piece 56 of the later-described temperature detection member 51 is set so as to fit into the recessed portion 25B. Note that the depth of the recessed portion 25B is set to be a dimension that is equal to or slightly larger than the plate thickness of the bus bar 21 (see FIG. 8).

Also, as shown in FIG. 7, a reception groove 31 that receives element accommodation portions 53 of the later-described temperature detection members 51 are formed on the outer sides of the bus bar holding portions 24 aligned on the far side.

The receiving groove 31 is formed so as to extend in the alignment direction (left-right direction in FIG. 7) of the multiple bus bar holding portions 24. The element accommodation portions 53 of the later-described temperature detection members 51 and wires W2 that are guided from the element accommodation portions 53 are arranged in the receiving groove 31. The upper portion of the receiving groove 31 is open.

In the outer-side walls 24A of the bus bar holding portions 24 aligned on the far side among the two rows of bus bar holding portions 24, cover locking holes 30 that lock the later-described covers 33 are provided between adjacent bus bar holding portions 24. Locking portions (not shown) that receive lock protrusion portions 36 (examples of locked portions) of later-described lock pieces 35 provided on the cover 33 are formed in the hole walls of the cover locking holes 30.

Also, connector holding portions 26 are formed between the two rows of the bus bar holding portions 24, and wire accommodating grooves 27 are provided between the connector holding portions 26 and the bus bar holding portions 24.

The wire accommodating grooves 27 are for accommodating the wires W1 connected to the end portions on one side of the terminals 47 accommodated in the terminal accommodation portions 45 of the connectors 40, which are held in the connector holding portions 26.

As shown in FIG. 8, the two wire accommodation grooves 27 each have a pair of groove wall portions 27A and 27B and a bottom portion 27C connecting the groove wall portions 27A and 27B, and can accommodate multiple wires W1 therein.

Also, wire fixing portions 28 that restrict protrusion of the wires W1 from the wire accommodation groove 27 are each formed on an upper edge of the wire accommodation groove 27 from one groove wall portion 27A to the other groove wall portion 27B. The wire fixing portions 28 are provided located between adjacent bus bar holding portions 24.

In the present embodiment, the connector holding portions 26 are provided between the two wire accommodation grooves 27. The connector holding portions 26 have shapes that conform to the outer circumferences of the connectors 40.

In the present embodiment, covers 33 that cover the open portion of the receiving groove 31 are provided. In the present embodiment, the covers 33 are integrated via the insulating protectors 23 and hinges 32. The covers 33 are composed of an insulating material, similarly to the insulating protectors 23.

The covers 33 are provided in the extension direction (left-right direction in FIG. 7) of the receiving groove 31. At positions on the edge portions of the covers 33 that correspond to the cover engagement holes 30 of the above-described insulating protectors 23 when the covers 33 are closed, the lock pieces 35 provided with the lock protrusion portions 36 (examples of locked portions) that are locked in locking portions (not shown) in the cover locking holes 30 are formed so as to protrude (see FIG. 8).

When the covers 33 are closed, the covers 33 are put in a state in which they will not open due to the lock protrusion portions 36 engaging with the locking portions (not shown) (see FIG. 10).

For example, as shown in FIG. 9, four terminals 47 are accommodated in each connector 40 held in the connector holding portions 26. The connectors 40 each include a roughly cuboid housing 41 and four terminals 47 accommodated in the housing 41.

As shown in FIG. 10, a locking piece 42 that receives the locking protrusion portion 14 of the connector portion 13 and is locked with respect to the single-cell battery 11 is formed in the housing 41. A locking hole 42A into which the engaging protrusion portion 14 fits is formed in the locking piece 42.

A groove portion 44 that receives the connector portion 13 is formed in the housing 41. Four terminal accommodation portions 45 are formed in parallel in the housing 41. A lance 46 that engages with the terminal 47 accommodated in the terminal accommodation portion 45 by protruding flexibly into the terminal accommodation portion 45 is formed on the inner circumferential surface of the terminal accommodation portion 45.

The terminals 47 accommodated in the housing 41 are female terminals 47, barrel portions 48 and 49 to which wires W1 are connected are formed on end portions on one side thereof (upper end portions in FIG. 10), and connection portions 50 that are box-shaped and can connect to the single-cell batteries are formed on the end portions on the other side thereof (lower end portions in FIG. 10).

Although this is not shown in detail in the drawings, the barrel portions 48 and 49 include a wire barrel portion 48 that is clamped to an exposed core wire (not shown) exposed at the terminal end of the wire W1, and an insulation barrel portion 49 that is clamped to a portion coated with the insulation coating of the wire W1.

An elastic contact piece (not shown) is formed on the connection portion 50, and the single-cell battery and the terminal 47 of the connector 40 are electrically connected due to the elastic contact piece and the terminal 15 of the connector portion 13 coming into contact. Also, an engaging portion (not shown) that engages with the lance 46 is formed between the connection portion 50 of the terminal 47 and the barrel portions 48 and 49.

The terminal 47 accommodated in the connector 40 is a terminal 47 that detects the voltage of a single-cell battery. The wire W1 connected to the terminal 47 is guided from the terminal accommodation portion 45 to the outside of the housing 41, is arranged in the wire accommodation groove 27 on the side opposite to the locking piece 42 of the housing 41, is guided to the outside of battery module M, and is connected to a control unit (not shown) such as an ECU, for example.

Figure 2:
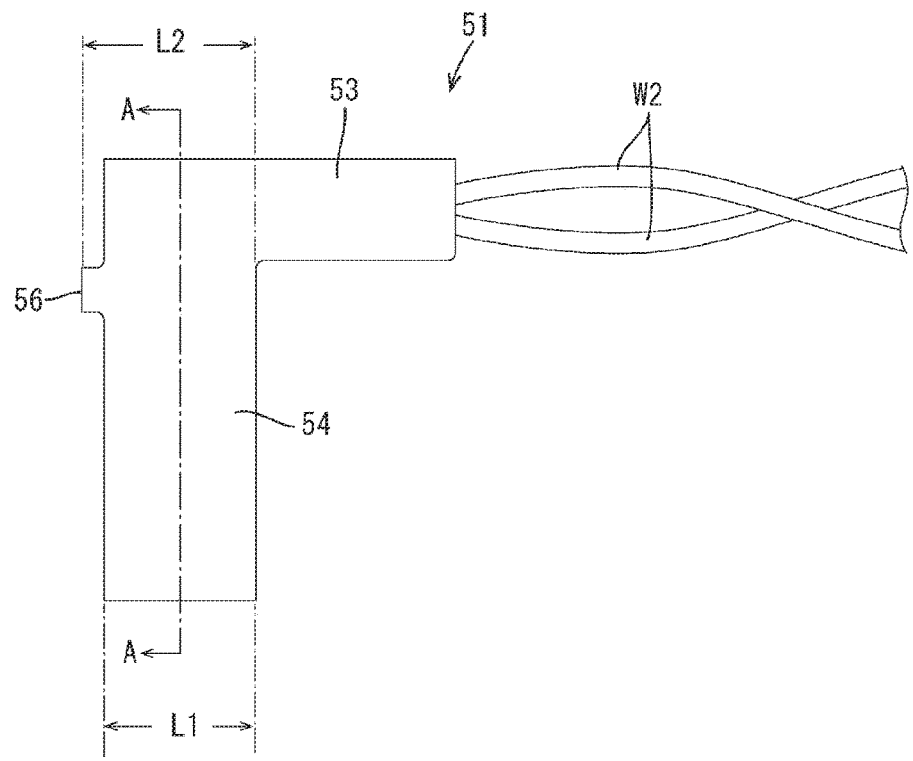
FIG. 2 is a plan view of a temperature detection member.
Figure 3:
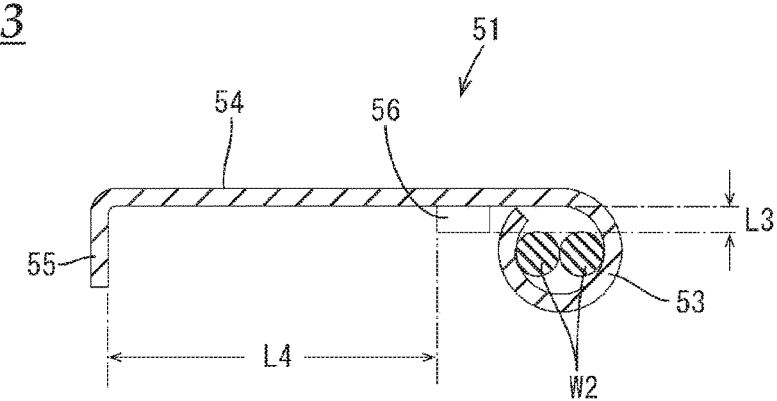
FIG. 3 is a cross-sectional view taken along line A-A in FIG. 2.

As shown in FIGS. 2 and 3, the temperature detection member 51 includes an element accommodation portion 53 that accommodates a temperature detection element (not shown) and to which wires W2 are guided, and a detection portion 54.

The element accommodation portion 53 has a cylindrical shape and accommodates a temperature detection element to which the wires W2 are connected. The temperature detection element is constituted by a thermistor, for example. A PTC thermistor or an NTC thermistor can be selected as appropriate as the thermistor. Also, as the temperature detection element, there is no limitation to the thermistor, and any element can be selected as appropriate as long as it can detect temperature.

The pair of wires W2 are connected to the temperature detection element and are guided from the element accommodation portion 53 to the outside. The wires W2 are connected to an external circuit (not shown) and a signal from the temperature detection element is transmitted to the external circuit via the wires W2. The external circuit is arranged in a battery ECU (not shown), for example, and detects the temperature of the bus bar 21 by means of the signal from the temperature detection element.

The detection portion 54 has a plate shape that is extended in a perpendicular direction from the extension direction of the element accommodation portion 53 on an end portion on one side in the extension direction of the element accommodation portion 53, and the entirety of the temperature detection member 51 is approximately L-shaped in plan view. The detection portion 54 is overlaid on the above-described bus bar 21 and comes into planar contact with the bus bar 21.

At the tip portion (lower end portion in FIG. 2) of the detection portion 54, the crimped piece 55 for crimping the detection portion 54 to the bus bar 21 is formed so as to extend across the entire region in the width direction (see FIG. 3). The crimped piece 55 has a shape that is bent in a perpendicular direction from the plate surface of the detection portion 54 toward the downward side of FIG. 3, in a state prior to the detection portion 54 being attached to the bus bar 21. The width dimension L1 (dimension in the left-right direction of FIG. 2) of the crimped piece 55 is set to be a dimension that is slightly less than or equal to the width dimension L5 of the above-described recessed portion 22 of the bus bar 21 (L1≤L5).

Furthermore, an edge portion on one side (the edge portion on the left side in FIG. 2) of the base end of the detection portion 54 that extends from the element accommodation portion 53 is provided with the abutting piece 56 that protrudes toward the outside. The abutting piece 56 protrudes from the detection portion 54 in the extension direction (left-right direction) of the element accommodation portion 53 and has a shape that is bent perpendicularly from the plate surface of the detection portion 54 toward the downward side in FIG. 3.

The width dimension of the abutting piece 56 is approximately the same as the wall thickness of the outer-side wall 24A of the bus bar holding portion 24. Also, the dimension L3 by which the abutting piece 56 protrudes downward from the detection portion 54 is a dimension that is approximately equal to the plate thickness of the bus bar 21 (see FIGS. 3 and 6). Also, in the abutting piece 56, the dimension L4 from the side edge portion on the crimped piece 55 side (side edge portion on the left side in FIG. 3) to the surface on the inner side of the crimped piece 55 (surface on the right side in FIG. 3) is set to be a dimension that is slightly larger than or equal to the dimension L6 (see FIG. 4) in the width direction of the portion of the bus bar 21 at which the recessed portion 22 is provided (L4≥L6, see FIG. 6).

As shown in FIG. 3, the element accommodation portion 53 has a larger thickness dimension in comparison to the detection portion 54. Also, the upper surface of the element accommodation portion 53 is flush with the upper surface of the detection portion 54.

The temperature detection member 51 of the present embodiment is produced by carrying out processing on a plate material made of metal, which is composed of copper, copper alloy, stainless steel (SUS), aluminum, or the like. The temperature detection member 51 is produced by forming a cylindrical element accommodation portion 53 due to carrying out bending or the like on a metal plate material that has been pressed into a predetermined shape, inserting the temperature detection element to which the wires W2 are connected into the element accommodation portion 53, and thereafter pouring insulating resin (e.g., epoxy resin) into the element accommodation portion 53 and allowing it to solidify.

Figure 5:
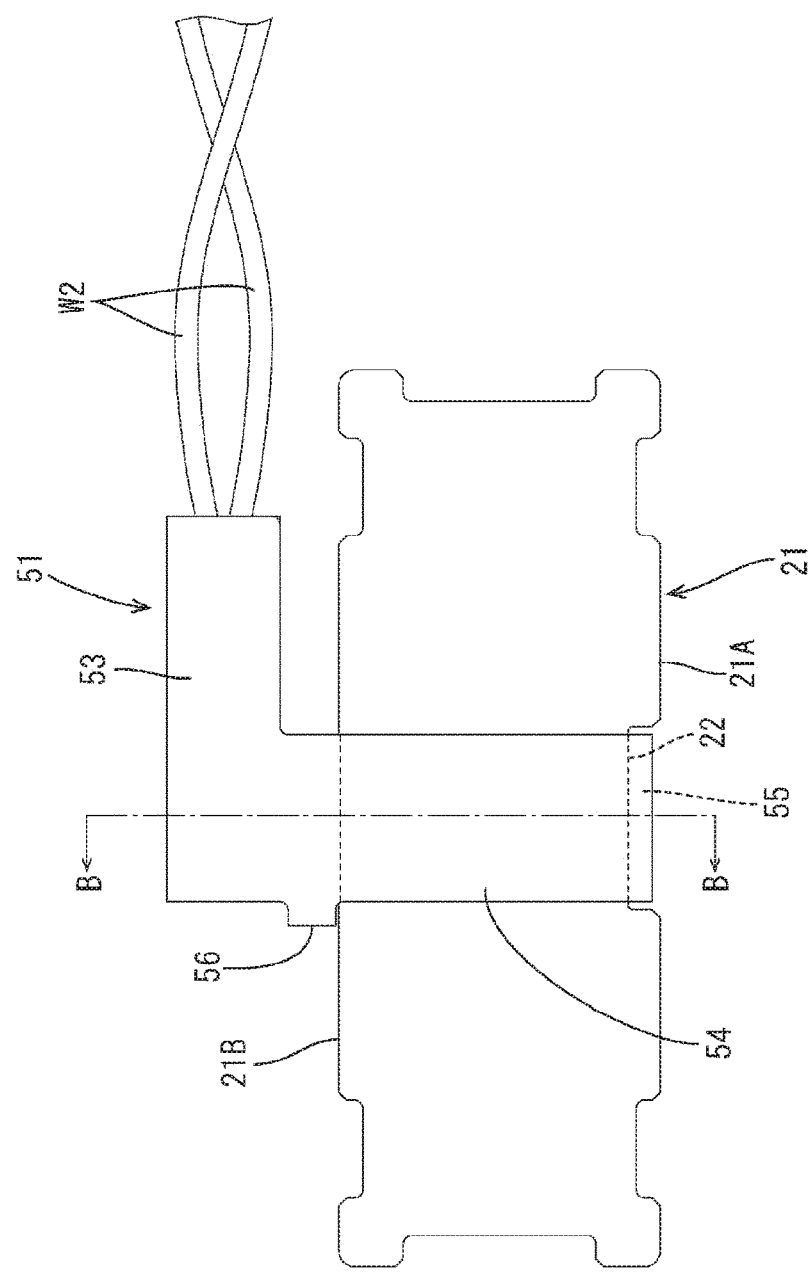
FIG. 5 is a plan view showing a state in which a temperature detection member is attached to a bus bar.
Figure 6:
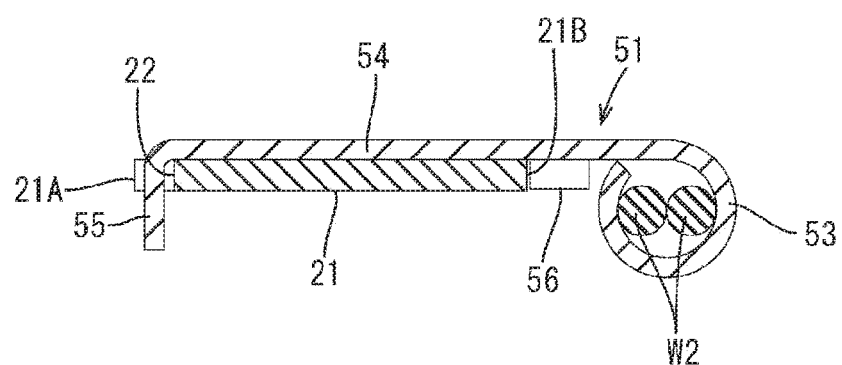
FIG. 6 is a cross-sectional view taken along line B-B in FIG. 5.

When the temperature detection member 51 of the present embodiment is to be attached to the bus bar 21, first, the crimped piece 55 of the detection portion 54 is fit into the recessed portion 22 of the first edge portion 21A of the bus bar 21, the side edge portion on one side of the abutting piece 56 is caused to abut against the second edge portion 21B of the bus bar 21, and the detection portion 54 is overlaid on and brought into planar contact with the bus bar 21 (see FIGS. 5 and 6). The bus bar 21 is fit between the crimped piece 55 and the side edge portion of the abutting piece 56. Also, the crimped piece 55 is fit into the recessed portion 22 of the bus bar 21 in the width direction. Accordingly, lateral misalignment of the detection portion 54 with respect to the plate surface of the bus bar 21 is prevented and positioning is achieved.

Next, bending is performed so as to cause the tip portion of the crimped piece 55 to conform to the lower surface side (surface on the side opposite to the surface on which the detection portion 54 is overlaid) of the bus bar 21, whereby the crimped piece 55 is crimped to the bus bar 21. Accordingly, the temperature detection member 51 is held in a state of being in contact with the bus bar 21. In other words, the temperature detection member 51 and the bus bar 21 are held in a state of being connected in a heat-transferable manner. Accordingly, the heat produced by the single-cell battery 11 due to charging or discharging is transferred from the electrode terminal 12 to the bus bar 21, and is transferred from the bus bar 21 to the temperature detection member 51.

When the wiring module 20 of the present embodiment is to be assembled, first, the bus bar 21 with the temperature detection member 51 attached as described above is accommodated in a certain bus bar holding portion 24 of the insulating protector 23, and a single bus bar 21 is accommodated in each of the other bus bar holding members 24 (see FIG. 7). In the temperature detection member 51, the detection portion 54 is accommodated in the bus bar holding portion 24 along with the bus bar 21, and the element accommodation portion 53 is accommodated in the receiving groove 31. Also, the base end of the detection portion 54 that extends from the element accommodation portion 53 is fit into the pass-through portion 25. The wires W2 connected to the temperature detection element are routed in the receiving groove 31. Note that the edge portion of the bus bar 21 accommodated in the bus bar holding portion 24 is locked by the pressing pieces 29, and thus the bus bar 21 is prevented from popping up.

In this state, the tip (lower end) of the abutting piece 56 is fit into the recessed portion 25B of the pass-through portion 25 (see FIG. 8), the detection portion 54 is interposed between the pair of groove walls (outer-side walls 24A) of the pass-through portion 25 (see FIG. 7), and thus the temperature detection member 51 is positioned with respect to the insulating protector 23.

Next, the terminals 47 having the end portions on one side connected to the wires W1 are accommodated in the terminal accommodation portions 45 of the connector 40 and the connector 40 is attached to the connector holding portion 26 by being fit into the connector holding portion 26.

Also, the wires W1 connected to the connector 40 are accommodated in the wire accommodation groove 27 (see FIGS. 7 and 8). When the wires W1 are to be accommodated, the wires W1 are accommodated in the wire accommodation groove 27 on the side opposite to the locking piece 42 provided in the housing 41 of the connector 40 to which the wires W1 are connected.

Next, an opening portion of the receiving groove 31 is covered by bending the cover 33 at the hinge 32. When the lock protrusion portion 36 abuts against the hole edge of the cover locking hole 30, the lock piece 35 of the cover 33 deforms due to flexing in the outside direction, and the lock protrusion portion 36 elastically reverts upon reaching the locking recessed portion 30A in the cover locking hole 30. Accordingly, the lock protrusion portion 36 is locked in the locking recessed portion 30A.

The multiple single-cell batteries 11 are aligned such that adjacent electrode terminals 12A and 12B have different polarities, and the wiring modules 20 in which the temperature detection members 51, the bus bars 21, and the connectors 40 are arranged are attached to surfaces on which the electrode terminals 12A and 12B of the single-cell batteries 11 are formed. Upon doing so, the connector portions 13 of the single-cell batteries 11 are arranged in the connector holding portions 26.

Next, laser welding is performed at the portions at which the bus bars 21 and the electrode terminals 12 are overlaid, and the bus bars 21 and the electrode terminals 12 are electrically connected. Thereafter, the connectors 40 are pressed downward, whereby the connectors 40 and the single-cell batteries are electrically connected. Accordingly, the battery module M is completed.

According to the present embodiment, due to the detection portion 54 of the temperature detection member 51 being overlaid on and being brought into planar contact with the bus bar 21 and the crimped piece 55 being crimped to the bus bar 21, the detection portion 54 and the bus bar 21 can be held in a connected state. Accordingly, compared to a configuration in which a fastening member that fixes the temperature detection member 51 to the bus bar 21 is provided separately, it is possible to reduce the number of parts and reduce the number of work steps.

Also, since a configuration is used in which a recessed portion 22 is provided on the edge portion of the bus bar 21 and the crimped piece 55 provided on the detection portion 54 is fit into the recessed portion 22 and crimped, the detection portion 54 can be easily positioned with respect to and attached to the bus bar 21. Moreover, since misalignment is not likely to occur, the contact state can be held more reliably.

Furthermore, in the present embodiment, since a configuration is used in which the detection portion 54 is provided with the abutting piece 56 and the crimped piece 55 between which the bus bar 21 is interposed, the detection portion 54 is more reliably positioned with respect to the bus bar 21, and the temperature detection member 51 can be held more reliably with respect to the bus bar 21.

Other Embodiments

The technique disclosed in the present specification is not limited to the embodiment described by means of the description above and the drawings, and for example, the following embodiments are also encompassed in the technical scope.

In the above-described embodiment, a configuration was used in which the crimped piece 55 is provided at a position along the edge portion of the bus bar 21 with the detection portion 54 overlaid on the bus bar 21, but it is also possible to use a configuration in which a hole portion is provided in a region on the inner side of the bus bar 21 and the crimped piece is inserted into the hole portion and crimped to the bus bar 21, for example.

Also, the recessed portion 22 need not be provided, even if the crimped piece 55 is provided at a position along the edge portion of the bus bar 21.

Also, the abutting piece 56 need not be provided and can be omitted.

In the above-described embodiment, a configuration was used in which the detection portion 54 is overlaid between the pair of regions of the bus bar 21 that are overlaid on the electrode terminals 12A and 12B, but the region overlaid on the bus bar 21 is not limited to the above-described embodiment, and it may be overlaid on any region, as long as it is a region that does not interfere with the connections between the pair of electrode terminals and the bus bar.

The configuration of the temperature detection member 51 is not limited to the above-described embodiment, and for example, it is possible to perform modifications as appropriate without straying from the technique disclosed in the present specification, such as a configuration in which the element accommodation portion and the detection portion are joined in a T shape, or a configuration in which the element accommodation portion is arranged above the detection portion 54.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

REFERENCE SIGNS LIST

M Battery module
10 Single-cell battery group
11 Single-cell battery (electricity storage element)
12A, 12B Electrode terminal
20 Wiring module
21 Bus bar
21A First edge portion (edge portion)
21B Second edge portion (opposite edge portion)
22 Recessed portion
23 Insulating protector
24 Bus bar holding portion
25 Pass-through portion
31 Receiving groove
51 Temperature detection member
53 Element accommodation portion
54 Detection portion
55 Crimped piece
56 Abutting piece

The invention claimed is:

1. A structure for attaching a temperature detection member to a bus bar, comprising:
the bus bar that is overlaid on electrode terminals of a plurality of electricity storage elements each having positive and negative electrode terminals, and electrically connects adjacent said electrode terminals of the plurality of electricity storage elements; and the temperature detection member configured to detect the temperature of the bus bar, wherein the temperature detection member includes a plate-shaped detection portion, the detection portion being overlaid on a region of the bus bar other than regions overlaid on the electrode terminals, the region being between a pair of regions of the bus bar that are overlaid on the electrode terminals;

the detection portion has a crimped piece that is crimped to the bus bar;

the temperature detection member further includes an element accommodation portion that has a cylindrical shape and in which a temperature detection element is accommodated, the element accommodation portion being arranged in a region on an outer side of the bus bar;

the crimped piece is provided at a position along an edge portion of the bus bar in a state in which the detection portion is overlaid on the bus bar; and a recessed portion into which the crimped piece fits is provided on the edge portion of the bus bar.

2. A wiring module comprising:

the bus bar and the temperature detection member having the structure for attaching the temperature detection member to the bus bar according to claim 1; and an insulating protector that holds the bus bar and the temperature detection member.

3. A structure for attaching a temperature detection member to a bus bar, comprising:

the bus bar that is overlaid on electrode terminals of a plurality of electricity storage elements each having positive and negative electrode terminals, and electrically connects adjacent said electrode terminals of the plurality of electricity storage elements; and the temperature detection member configured to detect the temperature of the bus bar, wherein the temperature detection member includes a plate-shaped detection portion, the detection portion being overlaid on a region of the bus bar other than regions overlaid on the electrode terminals, the region being between a pair of regions of the bus bar that are overlaid on the electrode terminals;

the detection portion has a crimped piece that is crimped to the bus bar;

the temperature detection member further includes an element accommodation portion that has a cylindrical shape and in which a temperature detection element is accommodated, the element accommodation portion being arranged in a region on an outer side of the bus bar;

the crimped piece is provided at a position along an edge portion of the bus bar in a state in which the detection portion is overlaid on the bus bar; and an abutting piece that abuts against an opposite edge portion opposite to the edge portion of the bus bar to which the crimped piece is crimped is provided at a position on the detection portion that corresponds to the opposite edge portion.

* * * * *